Figure 1:
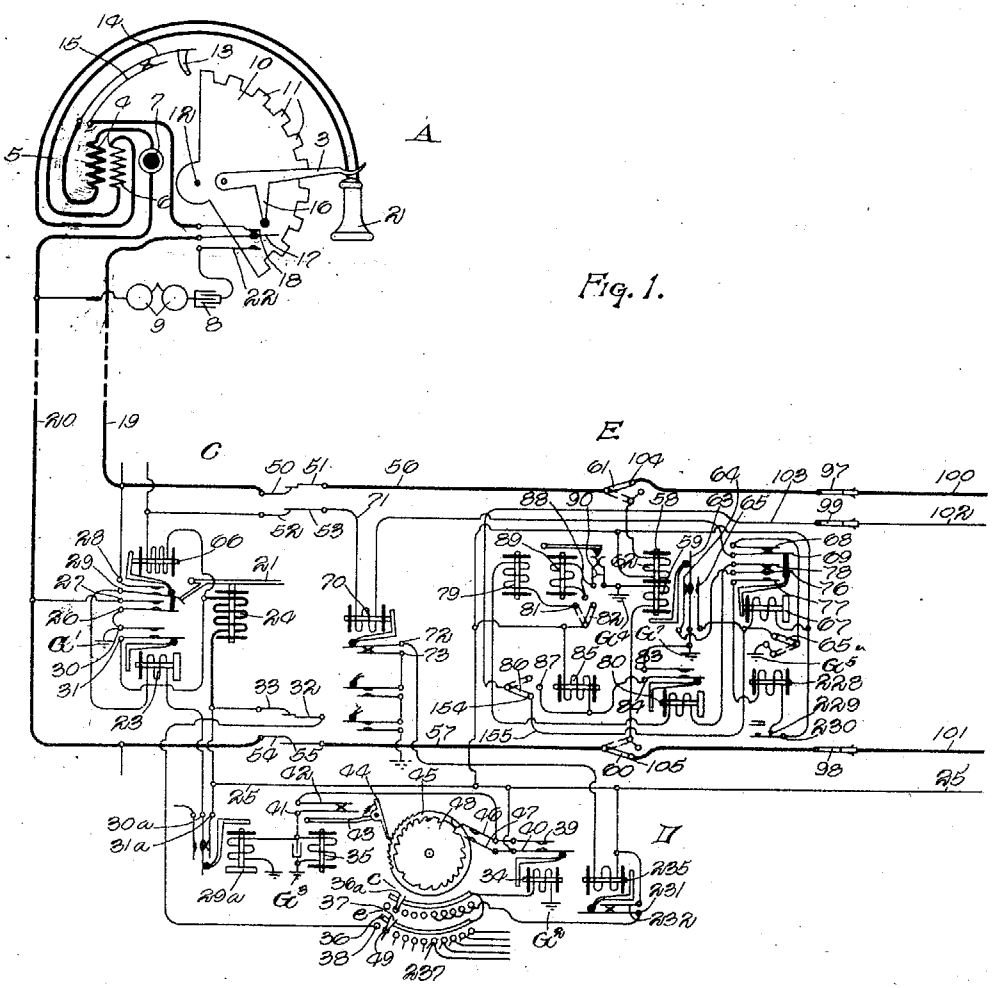

E. A. MELLINGER.

AUTOMATIC TRUNKING SYSTEM.

APPLICATION FILED FEB. 1, 1915.

Reissued Mar. 28, 1916.

14,096.

3 SHEETS—SHEET 1.

Witnesses

Herbert Hacke

Louis M. Landa

Inventor:

Edward A. Mellinger

By Charles C. Bulkley

Attorney.

E. A. MELLINGER.

AUTOMATIC TRUNKING SYSTEM.

APPLICATION FILED FEB. 1, 1915.

Reissued Mar. 28, 1916.

14,096.

3 SHEETS—SHEET 2.

Witnesses
Heinrich Wkaeke
Louis M. Landa

Inventor:
Edward A. Mellinger
By Charles C. Bulkley
Attorney.

E. A. MELLINGER.

AUTOMATIC TRUNKING SYSTEM.

APPLICATION FILED FEB. 1, 1915.

Reissued Mar. 28, 1916.

14,096.

3 SHEETS—SHEET 3.

Witnesses
Herbert W. Haake
Louis M. Linda

Inventor:
Edward A. Mellinger
By Charles C. Bulkley
Attorney.

UNITED STATES PATENT OFFICE.

EDWARD A. MELLINGER, OF CHICAGO, ILLINOIS, ASSIGNOR TO AUTOMATIC ELECTRIC COMPANY, OF CHICAGO, ILLINOIS, A CORPORATION OF ILLINOIS.

AUTOMATIC TRUNKING SYSTEM.

Specification of Reissued Letters Patent. Reissued Mar. 28, 1916.

14,096.

Original No. 1,110,071, dated September 8, 1914, Serial No. 501,260. Application for reissue filed February 1, 1915. Serial No. 5,578.

*To all whom it may concern:*

Be it known that I, EDWARD A. MELLINGER, a citizen of the United States of America, and resident of Chicago, Cook county, Illinois, have invented a certain new and useful Improvement in Automatic Trunking Systems, of which the following is a specification.

My invention relates to telephone exchange trunking systems of that general character in which means are provided for automatically selecting idle trunks to extend the calls in the direction of the called subscribers.

It relates more particularly to systems of that kind in which the subscribers are divided into groups, a set of trunks provided for each group, and another set of trunks provided which are common to all of the groups, whereby each calling subscriber has access to a set of trunks which are individual to his group, and also to a set of trunks which are common to the different groups.

The principal object of my invention is the provision of means whereby no subscriber can use one of the trunks which are common to the different groups until after all of the trunks which are individual to his group are busy or in use, thus limiting the service normally to the trunks which are individual to the different groups, and precluding use of the common or reserved trunks except when the trunks in one or more of the different groups are all busy. In this way the common trunks are maintained in reserve, and are kept clear of all traffic except that which may be termed the "overload", the normal load or traffic being taken care of by the trunks that are individual to the different groups. Furthermore, and in accordance with my invention, the fact that all of the trunks in one group are in use does not throw the common trunks open to use by the subscribers of all of the groups, inasmuch as for those groups in which there are trunks still available for use, the common trunks will still test busy, so that no calling subscribed can obtain one of these common trunks unless the trunks in his own individual group are busy. In this way my invention serves to increase the efficiency of the common trunks, as they are reserved exclusively for the use of those subscribers who are unable to find idle trunks in their individual groups, and the never accessible to other subscribers.

The nature and advantages of my invention will, however, hereinafter more fully appear.

In the accompanying drawings Figure 1 shows diagrammatically a calling subscriber's substation A and central office switching apparatus involving the principles of my invention. To the line of substation A is allotted the line switch C, which latter is controlled by the master switch D. At E is diagrammatically represented a first selector switch.

Figure 2:
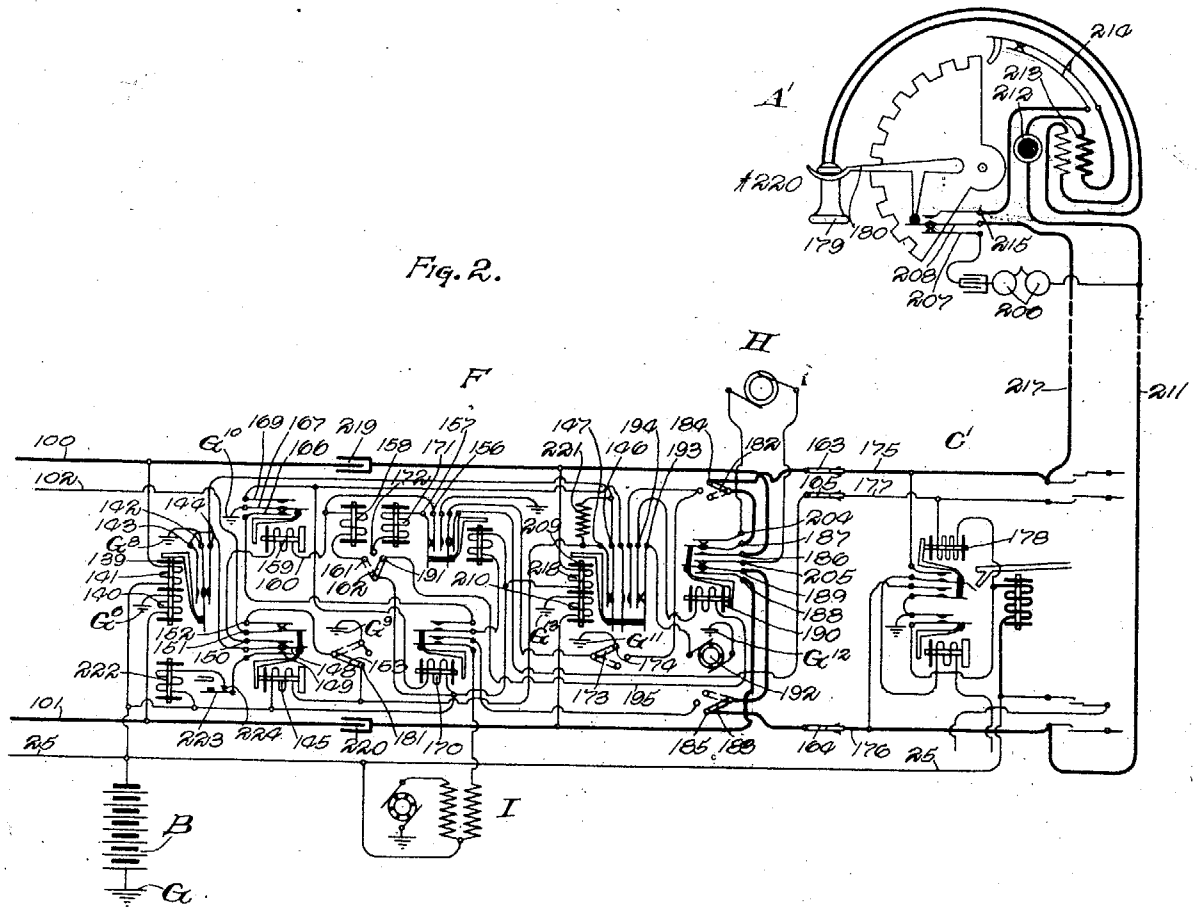

In Fig. 2 there is shown diagrammatically, a connector switch F, at H is shown a central office ringer generator, and at I a busy signaling device. To the line of the substation A′ there is allotted the line switch C′ which is like the line switch C.

Figure 3:
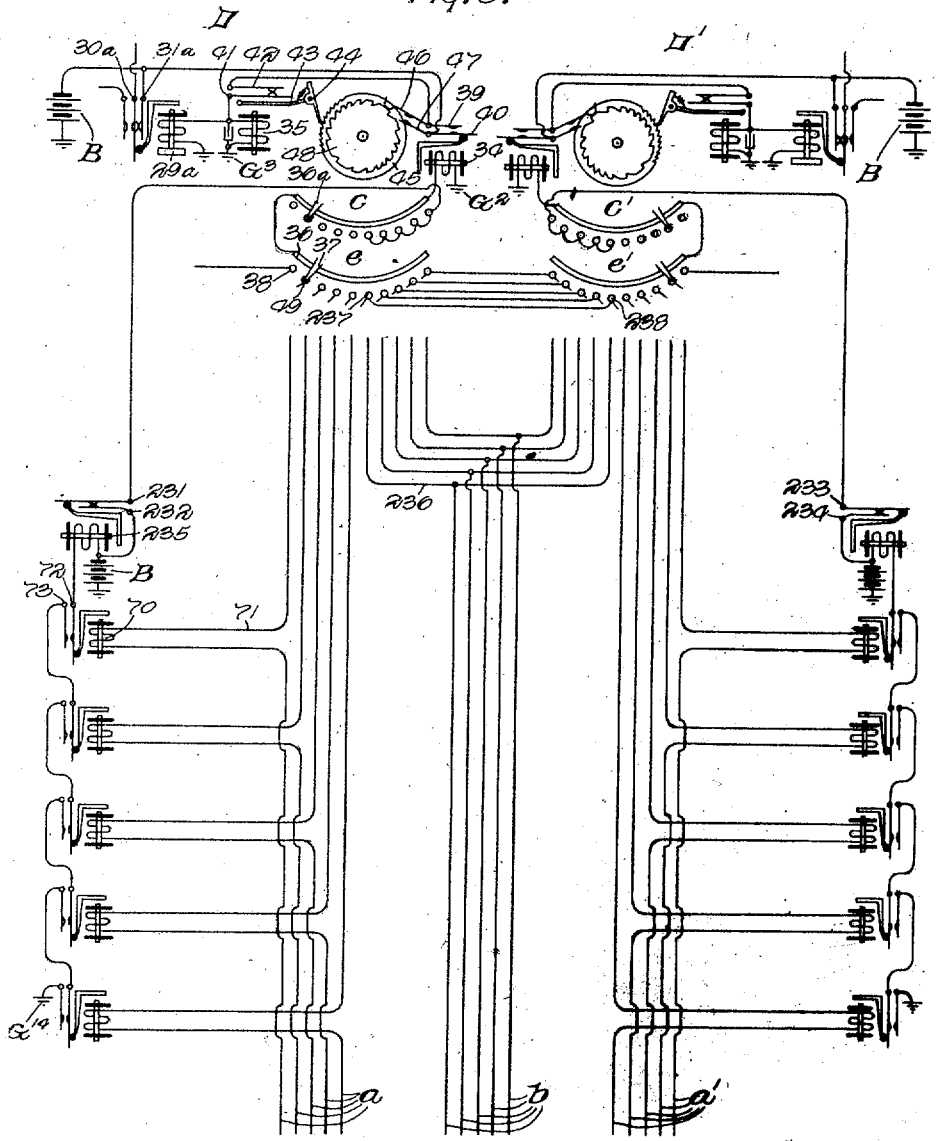

Fig. 3 shows diagrammatically trunk lines of two line switch groups, some of which are individual to one group and some to the other, and part of which are common to the two groups—that is, they may be used by subscribers in either group when the individual trunks allotted to that group are in use.

Figs. 1 and 2 taken together represent diagrammatically the central office switching apparatus involved in establishing a connection between two substations. In Fig. 2 a central battery is shown at B having its positive terminal preferably grounded at G. The central office switching apparatus is of the general type disclosed in English Patent No. 26,301 of 1906, but with modifications and circuit changes to adapt them to operate in connection with a two-wire system—that is, a system in which there is no ground connection at the subscriber's telephone. The line switches C and C′ and master switch D are modified forms of similar apparatus disclosed in *The Western Electrician* of January 25, 1908, and the *American Telephone Journal* of June 6, 1908. The first selector E is of the general type of selector switch shown in United States Letters Patent No. 815,321, issued March 13, 1906, to Keith, Erickson & Erickson, while the connector switch F is of the general type shown in United States Letters Patent No. 815,176, issued March 13, 1906 to Keith, Erickson & Erickson.

The master switch D in Fig. 3 controls the plungers of one group of line switches; likewise, the master switch D′ controls a second group of line switch plungers. To the first group are allotted exclusively the trunks *a* and, likewise, to the second group the trunks *a′* are allotted, while the trunks *b* have multiple terminals in both groups, so that they may be used by either group when all of its individual trunks *a* or *a′* are in use. It will be seen that each master switch is provided with a double set of bank contacts. The second set is so arranged and provided with a guarding potential that the master switch will not stop opposite any of the common trunks unless all of the individual trunks of its group are in use, under which circumstance the protection is removed from the common trunks, and the master switch may stop with the plungers opposite one of these trunks. Thus it will be seen that so long as any of the individual trunks of a group are idle the common trunks are not accessible. The common trunks, therefore, are merely an outlet when the calls of a group become so numerous and rapid that the individual trunks are not sufficient to properly take care of the traffic.

The subscriber's station, it will be seen, is somewhat different from the usual automatic substation, substation A being arranged and modified to operate in connection with a two wire system. Substation A, for example, comprises the usual receiver 2, switch hook 3, induction coil 4 which consists of the primary winding 5 and secondary winding 6, transmitter 7, condenser 8, ringer 9, and impulse wheel 10 which has the usual impulse teeth 11. The impulse wheel 10 is secured to the shaft 12 to which there is also secured the dial (not shown). When the dial is pulled down the springs 14 and 15 are not separated, but when it returns the impulse teeth 11 are adapted to engage the cam 13 upon the end of the spring 14, and carry the latter out of engagement with the spring 15 once by each tooth. Upon the switch hook 3 there is the cam 16, which when the switch hook is up, permits the springs 17 and 18 to engage, thereby bridging across the subscriber's line conductors 19 and 20 the primary circuit including the transmitter 7 in series with the primary winding 5; but when the switch hook is lowered the spring 17 is carried into engagement with the spring 22, whereby the ringer 9 in series with the condenser 8 is bridged across the line conductors 19 and 20 instead.

A clearer understanding of my improved system may be had from an explanation of its operation when a subscriber operates the central office switches to establish a connection. For example, it will be pointed out how the subscriber at substation A may operate the main office switches to establish connection with substation A′ (Fig. 2) the number of which is 220. To call the number 220 the subscriber at substation A, after removing the receiver from the switch hook, operates the calling device for each digit in the well known manner. When the receiver is removed from the switch hook, and the springs 17 and 18 engage, an energizing circuit is closed through the line relay 23 of the line switch C. When this relay energizes a circuit is closed through the trip or plunger magnet 24, which then operates to attract the plunger arm 21 and thrust the plunger into a bank terminal and extend the calling line conductors to a trunk line leading to a selector switch. The dial is operated for the first digit, and upon returning to normal position operates the first selector switch to establish connection with a trunk line leading to a connector switch. The impulses delivered by the dial for the last two digits are directed to the connector, which operates to place its shaft wipers in connection with the contacts corresponding to the desired number. When the substation primary circuit is bridged across the line conductors 19 and 20, an energizing circuit is established through the line relay 23 extending from ground G′ through the springs 26 and 27 to the line conductor 20 through the transmitter 7 and primary winding 5, impulse springs 14 and 15, springs 18 and 17 to the line conductor 19, springs 28 and 29, winding of the line relay 23, springs $30^a$ and $31^a$ to the battery lead 25, thence through battery B to ground G. When the plunger enters the bank terminal and closes the bank springs 32 and 33 in contact, an energizing circuit is closed through the motor magnet relay 34, which in turn operates to close a circuit through the motor magnet 35 of the master switch D. The motor magnet then operates to advance all idle plungers that are in locked engagement with the plunger shaft opposite the next idle bank terminal similar to the one just engaged. The circuit through the motor magnet relay extends from ground $G^2$ through the relay 34 to the common segment 36 of the master switch bank wiper 37, individual segment 38, through the bank springs 32 and 33 to the battery lead 25, thence through battery B and to ground G. The relay 34, upon energizing, operates to place the springs 39 and 40 in contact, whereby a circuit is closed through the motor magnet 35. This circuit extends from ground $G^3$ through the motor magnet 35, interrupter springs 41 and 42, motor magnet relay springs 39 and 40 to the battery lead 25, thence through battery B and to ground G.

The motor magnet, upon energizing, attracts its armature 43, and the pawl 44 engages a tooth of the ratchet wheel 45 and moves the latter one step. When this occurs the spring 46 engages the spring 47 (bearing in mind that the spring 46, prior to this operation, engages a notch of the toothed wheel 48), and when the ratchet wheel 45 is given one step the spring 46 slides off from the top of the notch and engages the spring 47. The engagement of these two springs provides a new energizing circuit for the motor magnet 35 extending through the springs 46 and 47 to the battery lead 25 instead of through the springs 39 and 40. When the circuit is closed for the motor magnet 35 an energizing circuit is also provided for the slow acting relay 29[a]. This relay then operates to separate the springs 30[a] and 31[a], thus disconnecting the trip or plunger magnet 24 from the battery lead, so that the switch C can not be operated while the master switch D is operating and moving the plungers from one position to another. Furthermore, the motor magnet when energized separates the interrupter springs 41 and 42, thereby breaking its own circuit in a manner similar to that of a buzzer. The motor magnet 35 continues to operate in this manner as long as the springs 46 and 47 remain in engagement. When the next succeeding tooth on the wheel 48 advances far enough, the spring 47 disengages from the spring 46 thereby opening the energizing circuit for the motor magnet. By the time this next notch disengages the springs 46 and 47 the master switch wiper 37 has passed from the first contact 38 to the second contact 49. Suppose, however, that when the wiper 37 engages the individual segment 49 there is a guarding potential present. In that event an energizing circuit is closed through the motor magnet relay 34 extending from the contact through the wiper 37, common segment of the master switch bank, through the winding of the relay 34 to ground G[2], as previously traced. The motor magnet relay again energizes and closes the circuit for the motor magnet. The motor magnet operates as before, and the wiper 37 is carried to the next contact, and the next tooth of the wheel 48 separates the springs 46 and 47. This operation continues as long as the wiper 37 continues to find contact segments with protecting potentials. Of course, it will be understood that when the motor magnet 35 thus operates, the plunger shaft and all plungers that are in locking engagement with the said shaft are moved to a new position opposite an idle bank terminal similar to the one engaged by the line switch C. At the instant that the plunger enters the bank the following springs are pressed into contact: 50 and 51, 52 and 53, 54 and 55 and 32 and 33. The engagement of the springs 50 and 51 and 54 and 55 extends the calling subscriber's line conductors 19 and 20 to the trunk line conductors 56 and 57 which terminate in the first selector E. This extension of the line provides an energizing circuit for the line relay 58 of the first selector. The circuit extends from ground G[4] through the winding 59, side switch wiper 60, trunk conductor 57, bank springs 55 and 54, line conductor 20, transmitter 7, primary winding 5, impulse springs 14 and 15, springs 18 and 17, line conductor 19, bank springs 50 and 51, trunk conductor 56, side switch wiper 61, through the winding 62 to the battery lead 25, thence through battery B to ground G. The line relay 58 thereupon energizes and operates to carry the spring 63 out of engagement with the spring 64 and into engagement with the spring 65, thereby providing an energizing circuit for the slow acting release relay 67, which in turn operates to provide an energizing circuit for the bridge cut-off relay 66 and plunger magnet 24 in series of the line switch C. This circuit extends from ground G[5] through the side switch wiper 65[a], springs 68 and 69, winding of the private trunk relay 70, conductor 71, bank springs 53 and 52, bridge cut-off relay 66, trip or plunger magnet 24 to the battery lead 25, thence through battery B to ground G. The bridge cut-off relay energizes and operates to separate the springs 26 and 27 and 28 and 29, thereby disconnecting the subscriber's line conductors from the line switch C. The trip or plunger magnet 24, also being included in this circuit, retains the plunger arm in an attracted position and the plunger in the bank terminal. Thus it will be seen that the line switch, after being operated from the subscriber's station, is maintained in its operated position by a ground connection at the first selector switch E. Furthermore, the private line relay 70 also energizes and places the springs 72 and 73 in contact, but their operation at this time is of no significance. The slow-acting release relay 67 also carries the spring 76 from the spring 77 into contact with the spring 78.

The foregoing is the condition of the central office switches after the calling subscriber removes his receiver and before the dial is turned. When the dial returns to normal position for the first digit 2, the first selector switch E is operated. The first digit being 2, the impulse spring 14 is twice carried out of engagement with the impulse spring 15. As a result the energizing circuit through the line relay 58 is broken twice, and the spring 63 comes into contact with the spring 64 twice. After the two impulses are thus delivered the line relay 58 again energizes and carries the spring 63 into contact with the spring 65. As previously explained, the relay 67 is a slow-acting relay—that is, slow to deënergize, and when this energizing circuit is momentarily broken during the transmission of the vertical impulses just delivered, the said relay does not deënergize, but remains in an operated position with the springs 69 and 76 in contact with the springs 68 and 78. Then when the spring 63 engages the spring 64 two impulses are transmitted to the vertical magnet 79 over a circuit extending from ground $G^7$ through the springs 63 and 64 to the springs 76 and 78, through the private magnet relay 80, through the winding of the vertical magnet 79 to the side switch contact point 81, through the side switch wiper 82 to the battery lead 25, thence through battery B to ground G. The impulses being delivered, the vertical magnet 79 is thereby energized twice and the shaft wipers are given two vertical steps in the well known manner. It will be seen that the private magnet relay 80 is included in the energizing circuit of the vertical magnet 79. This relay also energizes, but being a slow-acting relay it energizes on the first impulse and remains so until all the impulses are transmitted. This relay, upon energizing, operates to close the springs 83 and 84 in contact, whereby an energizing circuit is established through the private magnet 85. This circuit extends from ground $G^7$ through the springs 83 and 84, private magnet 85 to the battery lead 25, thence through battery B to ground G. The private magnet relay 80 deënergizes after the last vertical impulse, since this deënergizing circuit is no longer maintained after the springs 63 and 64 disengage. Hence, the said relay deënergizes, permitting the springs 83 and 84 to disengage, whereby the energizing circuit through the private magnet 85 is in turn broken, which private magnet now deënergizes and permits the side switch to pass from first to second position, permitting the side switch wipers 86 and 82 to engage the contact points 87 and 88, respectively. The closure of contact between the side switch wiper 82 and the contact point 88 sets up an energizing circuit for the rotary magnet 89. This circuit extends from ground $G^4$ through the interrupter springs 90, winding of the rotary magnet 89, contact point 88, side switch wiper 82 to the battery lead 25, thence through battery B and to the ground G. The said rotary magnet then operates to rotate the shaft wipers, 97, 98 and 99 of the selector E into engagement with the first contact of the second level of the selector banks, from which contact it is assumed the trunk line conductors 100, 101 and 102 lead to the connector switch F. If the first trunk line is busy, however, and the wipers have to pass over busy trunk lines, then as soon as the private wiper 99 engages the first private bank contact the private magnet 85 again energizes, locking the side switch in second position. The energizing circuit for said private magnet extends from the grounded terminal G of the battery B through an occupying switch (not shown), through the private wiper 99, thence through the conductor 103 to the switch wiper 86, contact point 87, through the winding of the private magnet 85 to the battery lead 25, thence through battery B to ground G. The private magnet 85, upon thus becoming energized, locks the side switch wiper 82 in engagement with the contact point 88, whereby the rotary magnet 89 will be energized step by step until the wipers are carried beyond the last busy trunk line. At the instant that the private wiper leaves the last busy contact point the energizing circuit through the private magnet 85 is destroyed, and as a result the selector side switch passes to third position. If, however, there are no busy trunk lines the private magnet 85 releases the side switch to third position as soon as the wipers are carried into engagement with the first trunk line. As soon as the side switch passes to third position, as stated, the trunk line conductors 56 and 57 are extended to the conductors 100 and 101 which, in this case, it is assumed lead to the connector switch F. The extending of the line occurs, of course, as soon as the side switch wipers 61 and 60 engage the contact points 104 and 105, respectively. When the trunk line is thus extended to the connector switch F an energizing circuit is established through the line relay 139 in the same manner in which the energizing circuit was established through the line relay 58 of the selector switch E when the plunger of the line switch C entered the bank terminal. The energizing circuit through the line relay 139 extends from ground $G^6$ through the winding 140, trunk conductors 101 and 57 to the line conductor 20, thence through the substation to the line conductor 19, trunk conductors 56 and 100, thence through the winding 141 to the battery lead 25, and through battery B to ground G. The line relay 139, upon energizing, operates to shift the spring 142 from the spring 143 to the spring 144, whereby an energizing circuit is established through the slow acting release relay 145, extending from ground $G^8$ through the springs 142 and 144, springs 146 and 147, relay 145 to the battery lead 25, thence through battery B to ground G. When the relay 145 energizes, the spring 148 is shifted out of contact with the spring 149 and into contact with the spring 150, and the spring 151 is shifted into engagement with the spring 152. This primary operation of the connector relays 139 and 145 occurs at the instant that the side switch wipers 60 and 61 of the selector E pass to third position and extend the subscriber's line conductors to the connector F. The engagement of the springs 151 and 152 establishes a guarding potential for protecting the trunk line conductors 100, 101 and 102 against seizure by another line and first selector. This potential extends from ground $G^9$ to the side switch wiper 153, springs 152 and 151, and conductor 102 to the private bank contact engaged by the shaft wiper 99. Furthermore, when the side switch of the first selector E passes to third position a new energizing circuit is established through the release relay 67, said circuit extending from ground $G^9$ at the connector switch F (Fig. 2), through the springs 152 and 151, conductor 102 to the bank contact engaged by the private wiper 99 of the selector switch E, side switch wiper 86, contact point 154, conductor 155, relay 67 to battery lead 25, thence through battery B and to ground G.

The operation of the dial for the last two digits affects the connector switch, and when the dial is operated for the second digit 2 the impulse spring 14 is twice carried out of engagement with the spring 15, thereby momentarily deënergizing the line relay 139 twice, whereby the spring 142 twice engages the spring 143, thus sending two impulses to the vertical magnet 158 from ground $G^8$ through the springs 142 and 143, springs 148 and 150, private magnet relay 159, conductor 160, through the vertical magnets 158, contact point 161, side switch wiper 162 to the battery lead 25, thence through battery B to ground G. The private magnet relay 159 energizes when the first impulse is delivered, and since the said relay is slow acting it remains in an operated position until all the vertical impulses are sent. The vertical magnet, upon being energized, operates one step at a time to carry the shaft wipers 163, 164 and 165 two steps to a point opposite to the second level. The relay 159, upon energizing, shifts the springs 166 and 167 out of engagement, and the springs 167 is shifted into engagement with the spring 169. When the springs 167 and 169 engage, an energizing circuit is established through the private magnet 170 from ground $G^{10}$, through the springs 167 and 169, private magnet 170 to the battery lead 25, thence through battery B to ground G. After all the impulses are delivered, and the line relay 139 returns to its operated position, the circuit through the relay 159 becomes permanently broken, thus permitting the springs 169 and 167 to return to normal position. When the springs 169 and 167 disengage, the circuit through the private magnet 170 becomes broken, whereby the said magnet deënergizes, permitting the side switch to pass from first to second position. The calling subscriber now operates the calling device for the last digit O, thereby transmitting ten impulses and operating the line relay 139 ten times. Each time that the line relay springs 142 and 143 engage, an energizing circuit is established through the rotary magnet 171 from ground $G^8$, through the said springs 142 and 143 and through the springs 148 and 150, through the private magnet relay 159, conductor 160, springs 156 and 157, through the rotary magnet 171 to the contact point 172, through the side switch wiper 162 to the battery lead 25, thence through battery B to ground G. Again the private magnet relay energizes as in the previous case, remaining so until all the impulses are transmitted, thereby retaining the private magnet also energized. The rotary magnet 171 then operates to rotate the shaft wipers into engagement with the desired line #220. If this line is busy at the time, the connector receives the busy test, whereby the calling subscriber is given a busy signal, and it becomes impossible to extend the calling line into connection with the called line. But if the called line is not busy then, as soon as the line relay 139 ceases to operate for the last digit, the private magnet relay 159 deënergizes as heretofore explained, thereby permitting the side switch to trip to third position. The result is that the side switch wipers engage, respectively, their contact points of the third position. When the side switch wiper 173 engages the contact point 174 a guarding potential is completed at the private wiper 165 for protecting the seized line from outside interference while the connection is established. This guarding potential extends from ground $G^{11}$ to the contact point 174, thence by way of the side switch wiper 173 to the private wiper 165. Not only does this guarding potential prevent other connectors from calling in on the same line over multiples of the normal conductors 175 and 176 and 177, but it also provides means for energizing the cut-off relay 178 of the line switch C′, whereby the switch C′ is prevented from operating when the called subscriber removes his receiver 179 from the switch hook 180. The trip magnet of the switch C′ is not operated at this time, as the resistance of this circuit is such that only the cut-off relay will be operated, the trip magnet being so constructed that it will not respond to this strength of current, but requires a stronger current to actuate it. It will also be seen that when the side switch passes to third position the trunk release conductor 102 that runs between the first selector and the connector is provided with guarding potential from ground $G^8$ through the line relay springs 142 and 144, back bridge relay springs 146 and 147, contact point 181, side switch wiper 153, release relay springs 152 and 151 to the trunk conductor 102. However, while the side switch is in first and second position a guarding potential for this trunk 102 is provided from ground $G^9$ through the side switch wiper 153 direct. The reason for this is that the guarding potential from ground $G^8$ is interrupted while the line relay 139 is operating and there is a possibility of some other selector similar to the selector E stopping on the same trunk line. After the side switch passes to third position, however, there is no such possibility, and the potential is provided from ground $G^8$ through the line relay springs as stated. Of course, when the side switch wipers 182 and 183 engage their third-position contact points 184 and 185, the trunk line is placed in connection with the called subscriber's line over the heavy conductors shown passing through the ringer relay springs 186 and 187 on one side, and 188 and 189 on the other side. As soon as connection is thus established the ringer relay 190 is energized over the circuit established when the side switch wiper 162 engages the contact point 191. The energizing current flows from ground $G^{12}$ at the ringer interrupter 192 through the back bridge relay springs 193 and 194, ringer relay 190. conductor 195, contact point 191 side switch wiper 162 to the battery lead 25, thence through battery B to ground G. It will be seen that as the interrupter 192 revolves, the energizing circuit of the ringer relay 190 will be broken periodically, so as not to ring the called subscriber continuously. Furthermore, it will be seen that each time that the ringer relay is energized the springs 187 and 189 are separated from the ringer relay springs 186 and 188 and brought into contact with the springs 204 and 205, which latter are the terminals of the ringer generator H. As a result ringing current is sent over the called line for energizing the bell 206 while the springs 207 and 208 are in contact. However, as soon as the called subscriber answers, the back-bridge relay 209 is energized by a flow of current from ground $G^{13}$, winding 210 of the back bridge relay 209, ringer relay springs 188 and 189, side switch wiper 183, contact point 185, line wiper 164, normal conductor 176, conductor 211, transmitter 212, primary winding 213, impulse springs 214, switch hook springs 215 and 208, line conductor 217, normal conductor 175, line wiper 163, contact point 184, side switch wiper 182, ringer relay springs 187 and 186, winding 218 of the back bridge relay 209, thence to the battery lead 25, and through battery B to ground G. Once the back-bridge relay 209 is energized, however, the energizing circuit for the ringer relay 190 is interrupted at a point between the springs 193 and 194, thus making it impossible for the ringer relay to energize as long as the called subscriber is on the line. Furthermore, when the relay 209 energizes, the springs 146 and 147 also disengage, thereby interrupting the circuit which provided a guarding potential to the conductor 102. When the springs 146 and 147 thus disengage, the resistance coil 221 is included in series instead of in multiple as before. The subscribers, being thus connected, may communicate over the main talking conductors indicated by the heavy lines in Figs. 1 and 2, and including on one side the condenser 219 at the connector F, and on the other side the condenser 220.

After the subscribers are through talking, the calling subscriber, if he hangs up his receiver first, opens up the line circuit at a point between the springs 17 and 18, thereby initiating the release of all of the switches. This release is brought about as follows: At the instant that the circuit is broken between the said springs 17 and 18 the double-wound line relay 139 and the release relay 145 of the connector F deënergize. At the instant that the slow-acting relay 145 and the line relay 139 deënergize, the energizing circuit for the release magnet 222 is closed at a point between the springs 148 and 149 and at another point between the springs 142 and 143. A flow of current is, therefore, set up from ground $G^8$ through the springs 142 and 143, through the springs 148 and 149 to the off normal springs 223, contact point 224 and the release magnet 222, through said magnet to the battery lead 25, thence through battery B to ground G. The release magnet instantly releases the connector switch shaft and restores the side switch, thereby breaking the energizing circuit through the back bridge relay 209 (if the called subscriber has not in the meantime restored his receiver,) and also breaking the energizing circuit through the bridge-cut-off relay 178 of the called line switch C′. As soon as the connector switch shaft reaches its lowest position it breaks the circuit for the release magnet 222 by separating the off normal spring 223 from the contact point 224, at which instant the release magnet of the connector is also restored. The operation of the line relay 139 and of the slow-acting relay 145 not only causes the release of the connector, as described, but also the release of the preceding switches, because the ground connection from ground $G^8$ to the trunk-release conductor 102 is interrupted by both of these relays. Since the release relay 67 is dependent upon this ground for its energized condition, as already explained, it follows that it will fall back with the following results: When the release relay 67 of the selector E deënergizes, the springs 76 and 77 are brought into contact, and as a result the energizing circuit for the release magnet 228 is closed. The energizing current for this release magnet 228 then flows from ground $G^7$ through the springs 63 and 64, and through the said springs 76 and 77 to the release magnet 228, thence through said magnet to the contact point 229, off normal spring 230 to the battery lead 25, thence through battery B to ground G. The release magnet, upon energizing, then restores the first selector side switch and switch shaft, which latter, upon reaching its lowest position, opens the energizing circuit for the release magnet 228 at a point between the off normal spring 230 and contact point 229. Furthermore, when the release relay 67 deënergizes and separates the springs 68 and 69, the energizing circuit of the bridge-cut-off relay in series with the plunger magnet 24 becomes broken, and as a result the bridge-cut-off relay and plunger magnet 24 restore to normal position. As a result the bank springs 52 and 53, as well as the other bank springs of the line switch C, are separated, thus preventing any further action from the trunk. After the switches are thus restored the calling subscriber can, of course, then proceed to make another call.

In the foregoing it has been pointed out how a subscriber may operate the central office switching apparatus to establish connection with a desired line. It will now be shown how the master switches D and D′ (Fig. 3) control the selection of the individual and common trunks. Upon referring to Fig. 3 it will be seen that the individual trunks *a* of the master switch D are allotted to the first contacts of the master switch bank level *e*, and that the individual trunks *a′* of the master switch D′ are allotted to the last contacts of the master switch bank level *e′*. The remaining contacts in the bank levels *e* and *e′* are multipled and allotted to the common trunks *b*. The master switch bank levels *e* and *e′* are so arranged that the master switches may be operated to carry the plungers of the line switches out of alinement with the common trunks *b*, except when all of the individual trunks are busy, for then the guarding potential is removed from the bank *e* or *e′*, and a common trunk *b* may be seized. This arrangement is as follows: In the banks *e* and *e′* the set of contacts corresponding to the common trunk line contacts in the banks *e* and *e′* are multipled and provided with a guarding potential—that is, the last contacts of the bank level *e* are all multipled and connected with the battery lead through the springs 231 and 232. In a similar manner the first contacts of the bank level *e′* are multipled and connected with the battery lead through the springs 233 and 234. Normally, then, these contacts are busy, and when the master switch wiper $36^a$ engages any one of these contacts an energizing circuit is established through the motor magnet relay 34, whereby the motor magnet 35 is in turn energized and operated to carry the master switch wiper $36^a$ out of engagement with the busy contacts. In the private line conductor 71 of each individual trunk line there is a relay 70 which energizes and places the springs 72 and 73 in contact, when the trunk line is seized, as previously explained. When the next trunk is seized the next relay energizes and places in contact its springs. Thus when all of the trunks, *a* are seized, all of the relays 70 are energized, and an energizing circuit is established through the relay 235, extending from ground $G^{14}$ through the series of springs of the relays 70, winding of the relay 235 to the battery B and to ground G. The relay 235 thereupon energizes and separates the springs 231 and 232, which removes the protecting potential from the bank level contacts corresponding to the common trunks *b*. These trunks are then accessible to line switches of the group which is controlled by the master switch D, but not to the line switches of the group controlled by the master switch D′, since the guarding potential through the springs 233 and 234 is still present on the common trunk line contacts of the bank level *e′*. When all of the individual trunks *a′* are busy simultaneously the protecting potential for the common trunks is removed in a similar manner. When all of the trunks *a* are busy, and the trunk 236 of the common group *b* is seized, a protecting potential is provided at the bank contact 237, in the usual manner, to prevent the master switch from stopping here; also this potential is transmitted to the contact 238 of the bank level *e′* of the master switch D′ to protect this same trunk line in that group. As soon, however, as any one of the trunks *a* is left in an idle condition the relay 70 corresponding to the trunk deënergizes, thereby separating its springs and breaking the circuit for the relay 235 which removed the protecting potential from the common trunks *b*. The potential is then established, and the common trunks *b* are not accessible until all the individual trunks *a* are again busy simultaneously.

Thus it will be seen that with my improved arrangement a group of, say, five trunks may be allotted to one hundred subscribers' line switches, and five more trunks may be allotted to a second group of subscribers' line switches; then to these two groups of subscribers' lines may be allotted five trunks in common, ten trunks being accessible from each subscriber's line switch group. The five trunks which are common to both subscribers' groups are not accessible, however, until all of the five individual trunks are busy; then a common trunk may be seized which is protected by a guarding potential established at both master switch banks.

From the foregoing it will be seen that I provide an arrangement whereby the common trunks *b* are only accessible to those subscribers who are unable to find idle trunks in their own individual groups. These common trunks are all normally provided with guarding potential, and this guarding potential exists in the different groups and is only destroyed or removed in the group or groups where the trunks are all busy. Thus under no circumstances can a subscriber who has available for his use a trunk in his own group obtain connection with one of the common trunks. In other words, these common trunks are reserved for what may be termed the "overload"—that is to say, the calls which are made in any group after all of the trunks for that group are busy, and in excess of what may be regarded as the average maximum number of calls that are liable to occur at the same time. In this way the efficiency of the common trunks is increased, as they are kept clear of everything except the overload or overflow of calls from the different groups, and are never available for any other purpose—that is to say, can never be used by calling subscribers in groups where there are still idle trunks to be found.

While I have shown a system in which all the switches are located at a single central office, it is obvious that if desired, some of these switches, such as the line switches, for example, could be located at a sub-central station, which station would be connected with the central station by means of the groups of individual and multiple trunks.

What I claim as my invention is:—

1. In a telephone exchange trunking system, a plurality of groups of subscribers' stations, a set of trunks for each group, another set of trunks common to all of the groups, means normally precluding use of said common trunks, and means serving to automatically render said common trunks available for service whenever all of the trunks of any group are in use.

2. In a telephone exchange trunking system, a subcentral station having the substations thereof divided into a plurality of groups, as many sets of trunks leading to said subcentral station as there are groups, another set of trunks leading to said subcentral station, said last set being common to all of the groups, means normally precluding use of said common trunks, and means serving to automatically render said common trunks available for service whenever all of the trunks of any group are in use.

3. In a telephone exchange trunking system subscribers' stations divided into a plurality of groups, a trunking switch at the central station for each subscriber, a set of trunks terminating only in the switches of one group, another set of trunks terminating only in the switches of another group, a third set of trunks terminating in the switches of all the groups, means normally precluding use of said common trunks, and means serving to automatically render said common trunks available for service whenever all of the trunks of any group are in use.

4. In a telephone exchange trunking system, subscribers' stations divided into groups, a set of five trunks for one group, a set of five trunks for another group, a set of five trunks common to all of the groups, whereby each subscriber has access to any one of ten trunks, five of which are individual to one group and five of which are common to all of the groups, means normally precluding use of said common trunks, and means serving to automatically render said common trunks available for service whenever all of the trunks of any group are in use.

5. In a telephone exchange trunking system, a group of subscribers' stations, another group of subscribers' stations, a set of trunks for one group, a set of trunks for the other group, a third set of trunks common to both groups, a master switch and trunking switches controlled thereby for use by the subscribers of one group, a master switch and trunking switches controlled thereby for use by the subscribers of the other group, whereby the trunks that are common to the two groups are subject to automatic selection by more than one master switch, each master operating independently of the other, means normally precluding use of said common trunks, and means serving to automatically render said common trunks available for service whenever all of the trunks of any group are in use.

6. In an automatic system in which calls are made and released over the two sides of the line circuit in series, a group of subscribers' stations, another group of subscribers' stations, a set of trunks for one group, a set of trunks for the other group, a third set of trunks common to both groups, a master switch and trunking switches controlled thereby for use by the subscribers of one group, and a master switch and trunking switches controlled thereby for use by the subscribers of the other group, whereby the trunks that are common to the two groups are subject to automatic selection by more than one master switch each master switch operating independently of the other, said system being operative for calling and releasing independently of the ground at the substations thereof.

7. In a telephone exchange trunking system, a plurality of groups of subscribers' stations, a set of trunks for each group, another set of trunks common to all of the groups, means normally establishing a guarding potential for all common trunks, a relay for each individual trunk, and a relay for each group, adapted to remove said guarding potential when all of the trunk relays of the group are energized.

8. In a telephone exchange trunking system a subcentral station having the substations thereof divided into a plurality of groups, as many sets of trunks leading to said subcentral stations as there are groups, another set of trunks leading to said subcentral station, said last set being common to all of the groups, means normally establishing a guarding potential for all common trunks, a relay for each individual trunk, and a relay for each group adapted to remove said guarding potential when all of the trunk relays of the group are energized.

9. In a telephone exchange a trunking system, subscribers' stations divided into a plurality of groups, a trunking switch at the central station for each subscriber, a set of trunks terminating only in the switches on one group, another set of trunks terminating only in the switches of another group, a third set of trunks terminating in the switches of all of the groups, means normally establishing a guarding potential for all common trunks, a relay for each individual trunk, and a relay for each group, adapted to remove said guarding potential when all of the trunk relays of the group are energized.

10. In a telephone exchange trunking system, subscribers' stations divided into groups, a set of five trunks for one group, a set of five trunks for another group, a set of five trunks common to all of the groups, whereby each subscriber has access to any one of ten trunks, five of which are individual to one group and five of which are common to all of the groups, means normally establishing a guarding potential for all common trunks, a relay for each individual trunk, and a relay for each group, adapted to remove said guarding potential when all of the trunk relays of the group are energized.

11. In a telephone exchange trunking system, a group of subscribers' stations, another group of subscribers' stations, a set of trunks for one group, a set of trunks for the other group, a third set of trunks common to both groups, a master switch and trunking switches controlled thereby for use by the subscribers of one group, a master switch and trunking switches controlled thereby for use by the subscribers of the other group, whereby the trunks that are common to the two groups are subject to automatic selection by more than one master switch, each master switch operating independently of the other, means normally establishing a guarding potential for all common trunks, a relay for each individual trunk, and a relay for each group, adapted to remove said guarding potential when all of the trunk relays of the group are energized.

12. In a telephone system, a trunk, another trunk, means for normally maintaining a guarding potential for the second trunk, and automatic means for removing said guarding potential when the first trunk is in use.

13. In a telephone system, a set of trunks, a reserve trunk, and automatic means whereby the reserve trunk will test busy until all the other trunks are in use.

14. In a telephone system, trunks arranged in groups, sufficient in number to carry the average normal load, a reserve set of trunks for carrying the overload, common to the different groups, and automatic means preventing use of the reserve trunks except when the trunks of one or more groups are all busy.

15. In a telephone system, a trunk, means serving normally to maintain a guarding potential for said trunk to prevent use thereof, and means serving to automatically remove said guarding potential when said trunk is to be used.

16. In a telephone system, a trunk, means whereby the said trunk will normally test busy to prevent use thereof, and means for automatically changing the test to show the trunk idle when it is desired that said trunk be used.

17. In a telephone system, a set of trunks, third conductors for each trunk, a relay in the third conductor of each trunk, another set of trunks, a relay common to said trunk relays, means for maintaining a normal guarding potential for said other trunks, controlled by said common relay, and a circuit for said common relay, controlled by all of said trunk relays, whereby said common relay is energized to remove the guarding potential when all of the trunk relays are energized.

18. In a telephone system, trunks arranged in groups, a set of trunks common to the said groups, a group of substations for each of said groups of trunks, and automatic means whereby the said common trunks are available for use only by calling substations of any group or groups in which the trunks are all busy.

19. In a telephone system, a plurality of master switches, a group of trunks for each master switch, a group of trunks common to said master switches, means for normally maintaining a guarding potential for said common trunks in all of said switches, and devices whereby the guarding potential is removed in one switch, when all of the individual trunks thereof are busy, without removing the guarding potential in the other switch or switches.

20. In a telephone system, groups of automatic switches, a group of trunks common to all of said switches, an individual group of trunks for each of said groups of switches, and means for maintaining a guarding potential on said common group of trunks until all of the trunks of an individual group are in use, said means controlled by relays in series with said individual trunks.

21. In a telephone system, a plurality of groups of automatic switches, a group of trunks common to all of said switches, a group of trunks individual to one of said groups of switches, and means for maintaining a guarding potential on said common trunks until said individual trunks are all in use, said means controlled by a relay connected in series with one of the trunks of said individual group.

22. In a telephone system, a plurality of groups of subscribers' lines, a set of trunks for each group, another set of trunks common to all of said groups, non-numerical switches for establishing connection between said lines and said trunks, means normally precluding use of said common trunks, and means serving to automatically render said common trunks available for service whenever all the trunks of any group are in use.

23. In a telephone system, a plurality of groups of subscribers' lines, a set of trunks for each group, another set of trunks common to all of said groups, non-numerical switches associated with the subscribers' lines for establishing connection with said trunks, means for normally precluding use of said common trunks, and means serving to automatically render said common trunks available for service whenever all the trunks of any group are in use.

24. In a telephone system, a group of automatic switches, a group of trunks common to all of said switches, an individual group of trunks for each of said switches, and means for maintaining a guarding potential on said common group of trunks until all of the trunks of an individual group are in use, said means controlled by relays in series with said individual trunks.

25. In a telephone system, a group of automatic switches, a group of trunks common to all of said switches, a group of trunks individual to one of said switches, and means for maintaining a guarding potential on said common trunks until said individual trunks are all in use, said means controlled by a relay connected in series with one of the trunks of said individual group.

26. In a telephone exchange trunking system, a plurality of groups of subscribers' stations, a set of trunks for each group, another set of trunks common to all of the groups, automatic means normally precluding use of said common trunks and serving to automatically render said common trunks available for service whenever all of the trunks of any group are in use.

27. In a telephone exchange trunking system, a plurality of groups of subscribers' stations, a set of trunks for each group, another set of trunks common to all of the groups, electromagnetic devices and circuits normally precluding use of said common trunks and serving to automatically render said common trunks available for service whenever all of the trunks of any group are in use.

28. In a telephone exchange trunking system, a subcentral station having the substations thereof divided into a plurality of groups, as many sets of trunks leading to said subcentral station as there are groups, another set of trunks leading to said subcentral station, said last set being common to all of the groups, automatic means normally precluding use of said common trunks and serving to automatically render said common trunks available for service whenever all of the trunks of any group are in use.

29. In a telephone exchange trunking system, a subcentral station having the substations thereof divided into a plurality of groups, as many sets of trunks leading to said subcentral station as there are groups, another set of trunks leading to said subcentral station, said last set being common to all of the groups, electromagnetic devices and circuits normally precluding use of said common trunks and serving to automatically render said common trunks available for service whenever all of the trunks of any group are in use.

30. In a telephone exchange trunking system, subscribers' stations divided into a plurality of groups, a trunking switch at the central station for each subscriber, a set of trunks terminating only in the switches of one group, another set of trunks terminating only in the switches of another group, a third set of trunks terminating in the switches of all the groups, automatic means normally precluding use of said common trunks and serving to automatically render said common trunks available for service whenever all of the trunks of any group are in use.

31. In a telephone exchange trunking system, subscribers' stations divided into a plurality of groups, a trunking switch at the central station for each subscriber, a set of trunks terminating only in the switches of one group, another set of trunks terminating only in the switches of another group, a third set of trunks terminating in the switches of all the groups, electromagnetic devices and circuits normally precluding use of said common trunks and service to automatically render said common trunks available for service whenever all of the trunks of any group are in use.

32. In a telephone exchange trunking system, subscribers' stations divided into groups, a set of five trunks for one group, a set of five trunks for another group, a set of five trunks common to all of the groups, whereby each subscriber has access to any one of ten trunks, five of which are individual to one group and five of which are common to all of the groups, automatic means normally precluding use of said common trunks and serving to automatically render said common trunks available for service whenever all of the trunks of any group are in use.

33. In a telephone exchange trunking system, subscribers' stations divided into groups, a set of five trunks for one group, a set of five trunks for another group, a set of five trunks common to all of the groups, whereby each subscriber has access to any one of ten trunks, five of which are individual to one group and five of which are common to all of the groups, electromagnetic devices and circuits normally precluding use of said common trunks and serving to automatically render said common trunks available for service whenever all of the trunks of any group are in use.

34. In a telephone exchange trunking system, a group of subscribers' stations, another group of subscribers' stations, a set of trunks for one group, a set of trunks for the other group, a third set of trunks common to both groups, a master switch and trunking switches controlled thereby for use by the subscribers of one group, a master switch and trunking switches controlled thereby for use by the subscribers of the other group, whereby the trunks that are common to the two groups are subject to automatic selection by more than one master switch, each master switch operating independently of the other, automatic means normally precluding use of said common trunks and serving to automatically render said common trunks available for service whenever all of the trunks of any group are in use.

35. In a telephone exchange trunking system, a group of subscribers' stations, another group of subscribers' stations, a set of trunks for one group, a set of trunks for the other group, a third set of trunks common to both groups, a master switch and trunking switches controlled thereby for use by the subscribers of one group, a master switch and trunking switches controlled thereby for use by the subscribers of the other group, whereby the trunks that are common to the two groups are subject to automatic selection by more than one master switch, each master switch operating independently of the other, electromagnetic devices and circuits normally precluding use of said common trunks and serving to automatically render said common trunks available for service whenever all of the trunks of any group are in use.

36. In a telephone exchange trunking system, a plurality of groups of subscribers' stations, a set of trunks for each group, another set of trunks common to all of the groups, automatic means normally establishing a guarding potential for all common trunks, a relay for each individual trunk, and a relay for each group, adapted to remove said guarding potential when all of the trunk relays of the group are energized.

37. In a telephone exchange trunking system, a plurality of groups of subscribers' stations a set of trunks for each group, another set of trunks common to all of the groups, electromagnetic devices and circuits normally establishing a guarding potential for all common trunks, a relay for each individual trunk, and a relay for each group, adapted to remove said guarding potential when all of the trunk relays of the group are energized.

38. In a telephone exchange trunking system, a subcentral station having the substations thereof divided into a plurality of groups, as many sets of trunks leading to said subcentral stations as there are groups, another set of trunks leading to said subcentral station, said last set being common to all of the groups, automatic means normally establishing a guarding potential for all common trunks, a relay for each individual trunk and a relay for each group adapted to remove said guarding potential when all of the trunk relays of the group are energized.

39. In a telephone exchange trunking system a subcentral station having the substations thereof divided into a plurality of groups, as many sets of trunks leading to said subcentral stations as there are groups, another set of trunks leading to said subcentral station, said last set being common to all of the groups, electromagnetic devices and circuits normally establishing a guarding potential for all common trunks, a relay for each individual trunk, and a relay for each group adapted to remove said guarding potential when all of the trunk relays of the group are energized.

40. In a telephone exchange trunking system, subscribers' stations divided into a plurality of groups, a trunking switch at the central station for each subscriber, a set of trunks terminating only in the switches of one group, another set of trunks terminating only in the switches of another group, a third set of trunks terminating in the switches of all of the groups, automatic means normally establishing a guarding potential for all common trunks, a relay for each individual trunk, and a relay for each group, adapted to remove said guarding potential when all of the trunk relays of the group are energized.

41. In a telephone exchange trunking system, subscribers' stations divided into a plurality of groups, a trunking switch at the central station for each subscriber, a set of trunks terminating only in the switches of one group, another set of trunks terminating only in the switches of another group, a third set of trunks terminating in the switches of all of the groups, electromagnetic devices and circuits normally establishing a guarding potential for all common trunks, a relay for each individual trunk, and a relay for each group, adapted to remove said guarding potential when all of the trunk relays of the group are energized.

42. In a telephone exchange trunking system, subscribers' stations divided into groups, a set of five trunks for one group, a set of five trunks for another group, a set of five trunks common to all of the groups, whereby each subscriber has access to any one of ten trunks, five of which are individual to one group and five of which are common to all of the groups, automatic means normally establishing a guarding potential for all common trunks, a relay for each individual trunk, and a relay for each group, adapted to remove said guarding potential when all of the trunk relays of the group are energized.

43. In a telephone exchange trunking system, subscribers' stations divided into groups, a set of five trunks for one group, a set of five trunks for another group, a set of five trunks common to all of the groups, whereby each subscriber has access to any one of ten trunks, five of which are individual to one group and five of which are common to all of the groups, electromagnetic devices and circuits normally establishing a guarding potential for all common trunks, a relay for each individual trunk, and a relay for each group, adapted to remove said guarding potential when all of the trunk relays of the group are energized.

44. In a telephone exchange trunking system, a group of subscribers' stations, another group of subscribers' stations, a set of trunks for one group, a set of trunks for the other group, a third set of trunks common to both groups, a master switch and trunking switches controlled thereby for use by the subscribers of one group, a master switch and trunking switches controlled thereby for use by the subscribers of the other group, whereby the trunks that are common to the two groups are subject to automatic selection by more than one master switch, each master switch operating independently of the other, automatic means normally establishing a guarding potential for all common trunks, a relay for each individual trunk, and a relay for each group, adapted to remove said guarding potential when all of the trunk relays of the group are energized.

45. In a telephone exchange trunking system, a group of subscribers' stations, another group of subscribers' stations, a set of trunks for one group, a set of trunks for the other group, a third set of trunks common to both groups, a master switch and trunking switches controlled thereby for use by the subscribers of one group, a master switch and trunking switches controlled thereby for use by the subscribers of the other group, whereby the trunks that are common to the two groups are subject to automatic selection by more than one master switch, each master switch operating independently of the other, electromagnetic devices and circuits normally establishing a guarding potential for all common trunks, a relay for each individual trunk, and a relay for each group, adapted to remove said guarding potential when all of the trunk relays of the group are energized.

46. In a telephone system, trunks arranged in groups, sufficient in number to carry the average normal load, a reserve set of trunks for carrying the overload, common to the different groups, and automatic electromagnetic devices and circuits preventing use of the reserve trunks except when the trunks of one or more groups are all busy.

47. In a telephone system, a trunk, means serving normally to maintain a guarding potential for said trunk to prevent use thereof, and electromagnetic devices and circuits serving to automatically remove said guarding potential when said trunk is to be used.

48. In a telephone system, a trunk, means whereby the said trunk will normally test busy to prevent use thereof, and electromagnetic devices and circuits for automatically changing the test to show the trunk idle when it is desired that said trunk be used.

49. In a telephone system, a set of trunks, third conductors for each trunk, a relay in the third conductor of each trunk, another set of trunks, a relay common to said trunk relays, automatic means for maintaining a normal guarding potential for said other trunks, controlled by said common relay, and a circuit for said common relay, controlled by all of said trunk relays, whereby said common relay is energized to remove the guarding potential when all of the trunk relays are energized.

50. In a telephone system, a set of trunks, third conductors for each trunk, a relay in the third conductor of each trunk, another set of trunks, a relay common to said trunk relays, electromagnetic devices and circuits for maintaining a normal guarding potential for said other trunks, controlled by said common relay, and a circuit for said common relay, controlled by all of said trunk relays, whereby said common relay is energized to remove the guarding potential when all of the trunk relays are energized.

51. In a telephone system, trunks arranged in groups, a set of trunks common to the said groups, a group of substations for each of said groups of trunks, and automatic electromagnetic devices and circuits whereby the said common trunks are available for use only by calling substations of any group or groups in which the trunks are all busy.

52. In a telephone system, a plurality of master switches, a group of trunks for each master switch, a group of trunks common to said master switches automatic means for normally maintaining a guarding potential for said common trunks in all of said switches, and devices whereby the guarding potential is removed in one switch, when all of the individual trunks thereof are busy, without removing the guarding potential in the other switches.

53. In a telephone system, a plurality of master switches, a group of trunks for each master switch, a group of trunks common to said master switches, electromagnetic devices and circuits for normally maintaining a guarding potential for said common trunks in all of said switches, and devices whereby the guarding potential is removed in one switch, when all of the individual trunks thereof are busy, without removing the guarding potential in the other switch or switches.

54. In a telephone system, groups of automatic switches, a group of trunks common to all of said switches, an individual group of trunks for each of said groups of switches, and automatic means for maintaining a guarding potential on said common group of trunks until all of the trunks of an individual group are in use, said means controlled by relays in series with said individual trunks.

55. In a telephone system, groups of automatic switches, a group of trunks common to all of said switches, an individual group of trunks for each of said groups of switches, and a relay and circuits for maintaining a guarding potential on said common group of trunks until all of the trunks of an individual group are in use, said relay controlled by relays in series with said individual trunks.

56. In a telephone system, a plurality of groups of automatic switches, a group of trunks common to all of said switches, a group of trunks individual to one of said groups of switches, and automatic means for maintaining a guarding potential on said common trunks until said individual trunks are all in use, said means controlled by a relay connected in series with one of the trunks of said individual group.

57. In a telephone system, a plurality of groups of automatic switches, a group of trunks common to all of said switches, a group of trunks individual to one of said groups of switches, and a relay and circuits for maintaining a guarding potential on said common trunks until said individual trunks are all in use, said relay controlled by a relay connected in series with one of the trunks of said individual group.

58. In a telephone system, a plurality of groups of subscribers' lines, a set of trunks for each group, another set of trunks common to all of said groups, non-numerical switches for establishing connection between said lines and said trunks, electromagnetic devices and circuits normally precluding use of said common trunks and serving to automatically render said common trunks available for service whenever all the trunks of any group are in use.

59. In a telephone system, a plurality of groups of subscribers' lines, a set of trunks for each group, another set of trunks common to all of said groups, non-numerical switches associated with the subscribers' lines for establishing connection with said trunks, electromagnetic devices and circuits for normally precluding use of said common trunks and serving to automatically render said common trunks available for service whenever all the trunks of any group are in use.

60. In a telephone system, a group of automatic switches, a group of trunks common to all of said switches, an individual group of trunks for each of said switches, electromagnetic devices and circuits for maintaining a guarding potential on said common group of trunks until all of the trunks of an individual group are in use said devices and circuits controlled by relays in series with said individual trunks.

61. In a telephone system, a group of automatic switches, a group of trunks common to all of said switches, a group of trunks individual to one of said switches, and electromagnetic devices and circuits for maintaining a guarding potential on said common trunks until said individual trunks are all in use, said devices and circuits controlled by a relay connected in series with one of the trunks of said individual group.

In testimony whereof I affix my signature in the presence of two witnesses.

EDWARD A. MELLINGER.

Witnesses:
FRANK NEWFORTH,
W. N. CURTIS.